US012801404B2

(12) United States Patent
Blum

(10) Patent No.: US 12,801,404 B2
(45) Date of Patent: Nov. 17, 2026

(54) METHOD FOR DETERMINING AN OPTIMAL EXECUTION LOCATION FOR AN APPLICATION

(71) Applicant: Siemens Healthineers AG, Forchheim (DE)

(72) Inventor: Thomas Blum, Neunkirchen A. Br (DE)

(73) Assignee: Siemens Healthineers AG, Forchheim (DE)

(*) Notice: Subject to any disclaimer, the term of this patent is extended or adjusted under 35 U.S.C. 154(b) by 675 days.

(21) Appl. No.: 18/171,773

(22) Filed: Feb. 21, 2023

(65) Prior Publication Data

US 2023/0266977 A1 Aug. 24, 2023

(30) Foreign Application Priority Data

Feb. 23, 2022 (EP) .................................... 22158218

(51) Int. Cl.
*G06F 9/448* (2018.01)
*G06F 9/50* (2006.01)

(52) U.S. Cl.
CPC .......... *G06F 9/4494* (2018.02); *G06F 9/5027* (2013.01); *G06F 2209/501* (2013.01)

(58) Field of Classification Search
CPC . G06F 9/4494; G06F 9/5027; G06F 2209/501
See application file for complete search history.

(56) References Cited

U.S. PATENT DOCUMENTS

| | | | | |
|---|---|---|---|---|
| 2002/0007229 | A1* | 1/2002 | Hudson | G05B 19/4148 700/247 |
| 2011/0321014 | A1* | 12/2011 | Nagoria | G06F 11/2289 717/124 |
| 2018/0027055 | A1 | 1/2018 | Balle et al. | |
| 2019/0156071 | A1* | 5/2019 | Kaladgi | H04M 1/72403 |
| 2019/0245757 | A1 | 8/2019 | Meyer et al. | |
| 2020/0404051 | A1* | 12/2020 | Guniguntala | H04L 67/1029 |
| 2021/0240459 | A1* | 8/2021 | Ranjan | G06F 9/5055 |

* cited by examiner

*Primary Examiner* — April Y Blair
(74) *Attorney, Agent, or Firm* — Harness, Dickey & Pierce, P.L.C.

(57) ABSTRACT

One or more example embodiments relates to a computer-implemented method for determining an optimal execution location for an application, the method comprising determining available execution locations, each of the available execution locations providing at least one execution parameter, the at least one execution parameter quantifying a suitability of the corresponding available execution location; determining the optimal execution location based on the provided execution parameters, the optimal execution location being a desired execution location for carrying out the application; and providing the optimal execution location.

20 Claims, 4 Drawing Sheets

METHOD FOR DETERMINING AN OPTIMAL EXECUTION LOCATION FOR AN APPLICATION

CROSS-REFERENCE TO RELATED APPLICATION(S)

The present application claims priority under 35 U.S.C. § 119 to European Patent Application No. 22158218.2, filed Feb. 23, 2022, the entire contents of which are incorporated herein by reference.

FIELD

One or more example embodiments of the present invention relates to a method for determining an optimal execution location for an application and a determining system which is configured to execute the method.

RELATED ART

It is known that applications and/or computer applications and/or applications that are executable with a computer are becoming ever more complex and computation-intensive. The execution of these applications is therefore also ever increasingly computation-intensive and ever more resources are required in order to execute the applications in a timely manner and in a good quality. For this reason, an optimal selection of an execution location and/or a site at which an application can be executed is of great relevance.

Frequently, in particular, in applications from the medical field, it is important that an application is executed in as timely a manner as possible after starting the application. In the medical field, it should therefore be ensured that, for example, a diagnosis which is determined by applying the application to data, for example examination data, is available as soon as possible and in a good quality in order to be able to decide over a further medical procedure. Therein, for different data and/or different medical technology devices, different applications adapted to the data and/or the medical device are executed.

The data that is to be applied to or processed by an application is therein typically acquired in the medical field with a medical technology device, for example a magnetic resonance tomography device or a computed tomography device or an X-ray system or a laboratory diagnostic system or an ultrasonic device, etc.

The application can then be executed directly on the medical technology device. In this case, the medical technology device is the execution location of the application. If each of the medical technology devices were to be equipped with sufficient computing power in order to execute the application in a timely manner and with good quality, it would incur high costs. In addition, the available computing power of the individual medical technology devices would not be optimally used. Typically, not all the medical technology devices are used equally in a medical environment. This would lead to frequently available computing power not being used on one medical technology device at one time point, whereas on another medical technology device, the available computing power possibly always is not yet sufficient and there result delays in the execution of the application. This results in high costs for non-optimally utilized computing power resources without it being ensured that the desired goal is actually always achieved.

An application-specific limitation in relation, for example, to the maximum computing power used by the application can also lead to the problems described above and additionally favors an unnecessary delay on execution of the application if sufficient computing power were to be available.

In order to circumvent this problem, at least one external computing unit is used as the execution location for the applications which together are utilized by the different medical technology devices collectively. An external computing unit of this type can be, for example, a local computing center in a so-called edge layer. Alternatively or additionally, such an external computing unit can be provided by a cloud provider in a so-called cloud layer and/or in a cloud system. Therein, a medical technology device transmits the data captured with the medical technology device to an external computing unit of this type. The application is executed on the external computing unit and applied to the data.

Typically, at least one external computing unit is fixedly associated with each application. In other words, an application is typically executed on one or more fixedly associated external computing units. In other words, a fixed execution location is associated with each application. This association can therein either be permanently fixedly specified or can be specified manually by a user on starting the application.

Therein, a fixed association also leads to the above-described problems as with the use of the individual medical technology devices as execution locations, since no flexible adaptation to the actually used computing power of the execution locations is possible. Due to lacking information items, a manual selection of the execution location regarding, for example, the capacity utilization of the different external computing units typically does not use the existing resources optimally and therefore also favors a delayed execution of the application.

In addition, it is ensured that the data also can and may actually be conveyed to the external computing unit. For this purpose, firstly a physical conveying capability must be provided, secondly, particularly in the medical environment, guidelines regarding data protection regulations must be complied with. The transfer and/or transmission of the data to the external computing unit can also lead to an undesirable delay. The transfer and/or a timespan for transferring the data can depend upon a bandwidth of the connection between the medical technology device and the execution location and/or the external computing unit. Therein, the bandwidth is typically temporally variable. It is typically not taken into account in a fixed association.

The example described from the medical field can naturally be transferred similarly to other fields, in particular also non-medical fields.

SUMMARY

One or more example embodiments of the present invention to provide a method which enables an optimal selection of an execution location at which the application can be executed with the least possible time delay.

One or more example embodiments provides a method for determining an optimal execution location for an application, by a determining system for determining an optimal execution location for an application, by a computer program product and by a computer-readable storage medium according to the independent claims. Advantageous developments are disclosed in the dependent claims and in the following description.

According to one or more example embodiments, a computer-implemented method for determining an optimal execution location for an application includes determining available execution locations, each of the available execution locations providing at least one execution parameter, the at least one execution parameter quantifying a suitability of the corresponding available execution location; determining the optimal execution location based on the provided execution parameters, the optimal execution location being a desired execution location for carrying out the application; and providing the optimal execution location.

According to one or more example embodiments, the method further includes providing at least one application parameter via the application, the at least one application parameter identifying a condition for execution of the application, each of the available execution locations provides an execution parameter corresponding to the at least one application parameter; and determining an optimal execution parameter based on the condition for execution of the application, wherein the determining the optimal execution location determines the optimal execution location based on the optimal execution parameter.

According to one or more example embodiments, the method further includes executing the application at the optimal execution location.

According to one or more example embodiments, the executing executed the application in a container at the optimal execution location.

According to one or more example embodiments, the condition for execution of the application includes at least one: data access speed, network speed, storage location for data, data quantity, current resource availability, predicted resource availability, costs of the execution, costs of data storage, data security requirements, performance requirements or latency.

According to one or more example embodiments, the providing the at least one application parameter provides more than one application parameter, and the determining available execution locations includes providing a corresponding execution parameter.

According to one or more example embodiments, a weighting factor is associated with each of the application parameters, and the determining the optimal execution location determines the optimal execution location based on the weighting factors of the application parameters.

According to one or more example embodiments, the application is configured for processing of data and the weighting factors depend upon the data to be processed by the application.

According to one or more example embodiments, the application is configured for processing of data and the at least one application parameter depends upon the data to be processed by the application.

According to one or more example embodiments, the determining the available execution locations determines the available execution locations at a first time point and the method further comprises planning execution of the application at the optimal execution location at a second time point, the first time point being temporally before the second time point, and the determining the available execution locations includes determining the at least one execution parameter of the execution location for the second time point for each execution location.

According to one or more example embodiments, the determining the at least one execution parameter includes applying a trained function to at least one prior execution parameter to the at least one execution parameter.

According to one or more example embodiments, the application is configured for processing of data, the data is captured at a third time point, the third time point being temporally before the second time point, the first time point being temporally before the third time point or the first time point is identical to the third time point, and the data is transmitted on capture directly to the optimal execution location.

According to one or more example embodiments, the application is a medical application.

According to one or more example embodiments, the available execution locations correspond to a location of at least one of a cloud system, an edge system, a local computer, a modality, a local computer center or a central computing center.

According to one or more example embodiments, after the determining of the optimal execution location, a user receives access to the optimal execution location for execution of the application.

According to one or more example embodiments, a determining system for determining an optimal execution location for an application includes an interface; and a computing unit, at least one of the interface or the computing unit being configured to determine available execution locations, the interface being configured to receive at least one execution parameter from each of the available execution locations, the at least one execution parameter quantifying a suitability of the corresponding available execution location, the computing unit configured to determine the optimal execution location for carrying out the application, and the interface being further configured to provide the optimal execution location.

According to one or more example embodiments, a non-transitory computer program product has a computer program that, when executed by a determining system, causes the determining system to perform a method according to one or more example embodiments.

According to one or more example embodiments, a non-transitory computer-readable storage medium has program portions that, when executed by a determining system, cause the determining system to perform a method according to one or more example embodiments.

BRIEF DESCRIPTION OF THE DRAWINGS

Features and advantages of one or more example embodiments of the present invention will now be more clearly and distinctly described in the context of the following description making reference to the drawings. The drawings and descriptions are not intended to restrict the invention and its embodiments in any way.

In the different drawings, the same components are provided with corresponding reference signs. The drawings are in general not to scale.

In the drawings:

Figure 1:
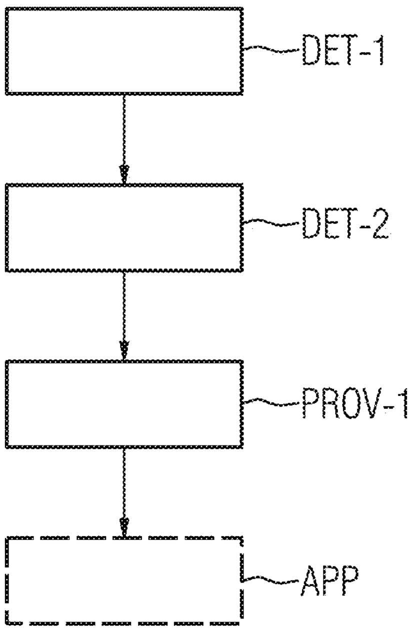
Figure 2:
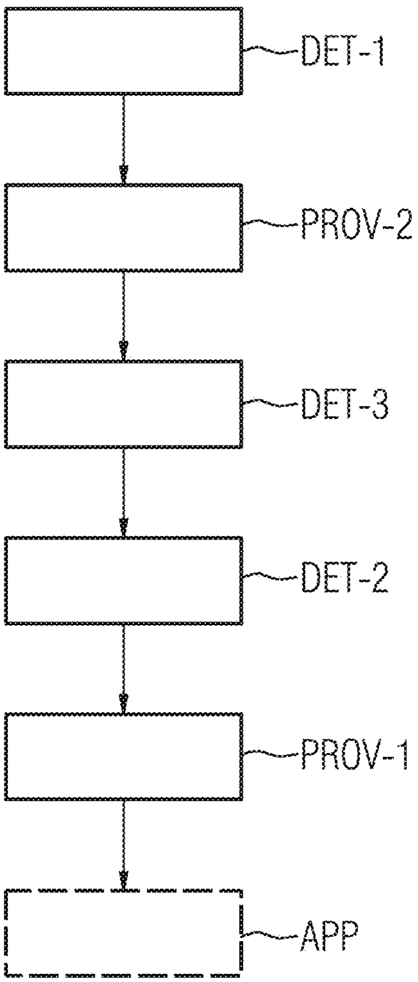
Figure 3:
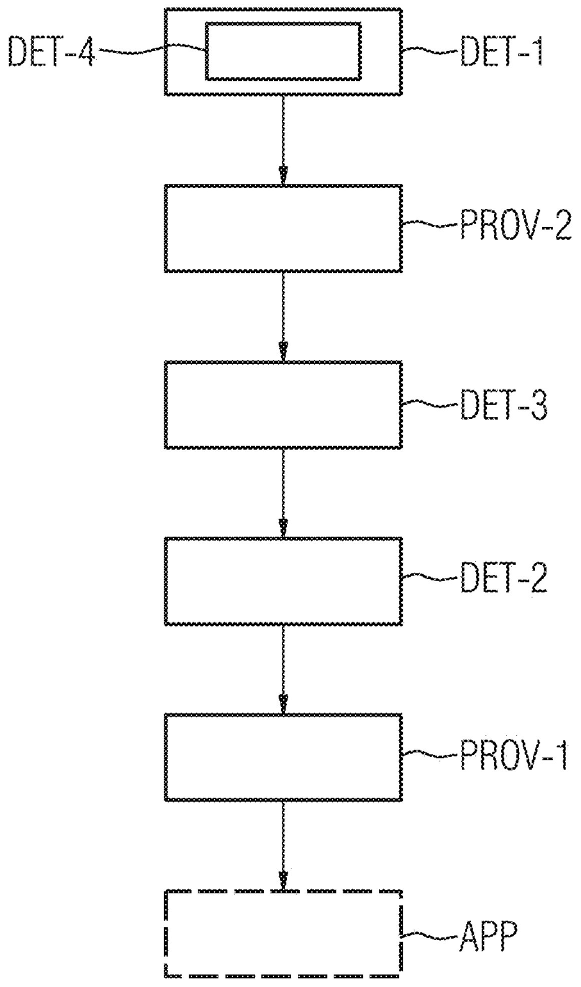
Figure 4:
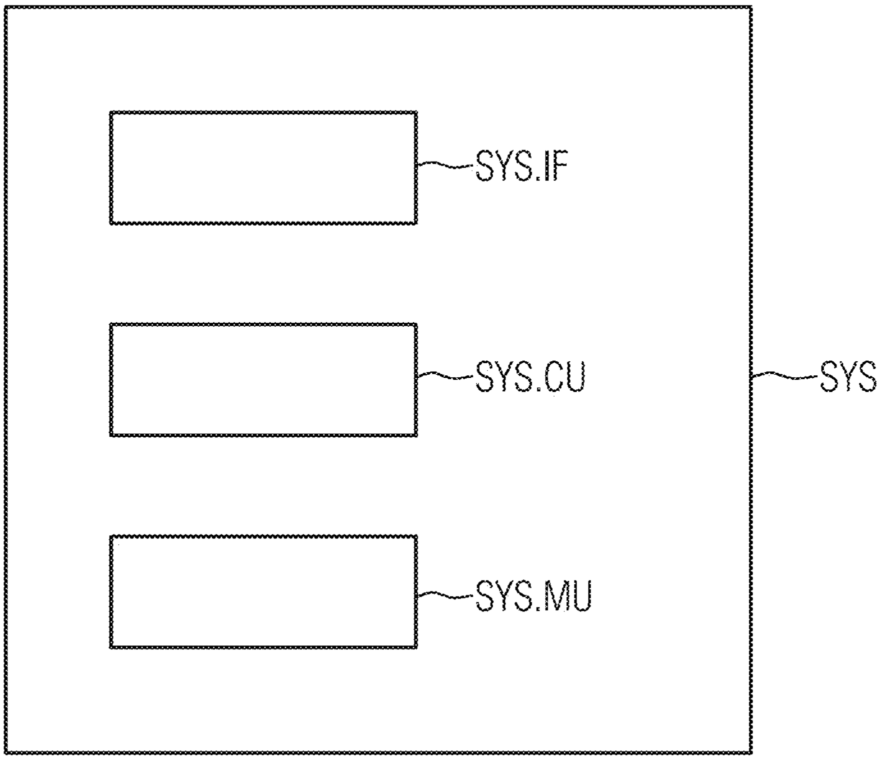
Figure 5:
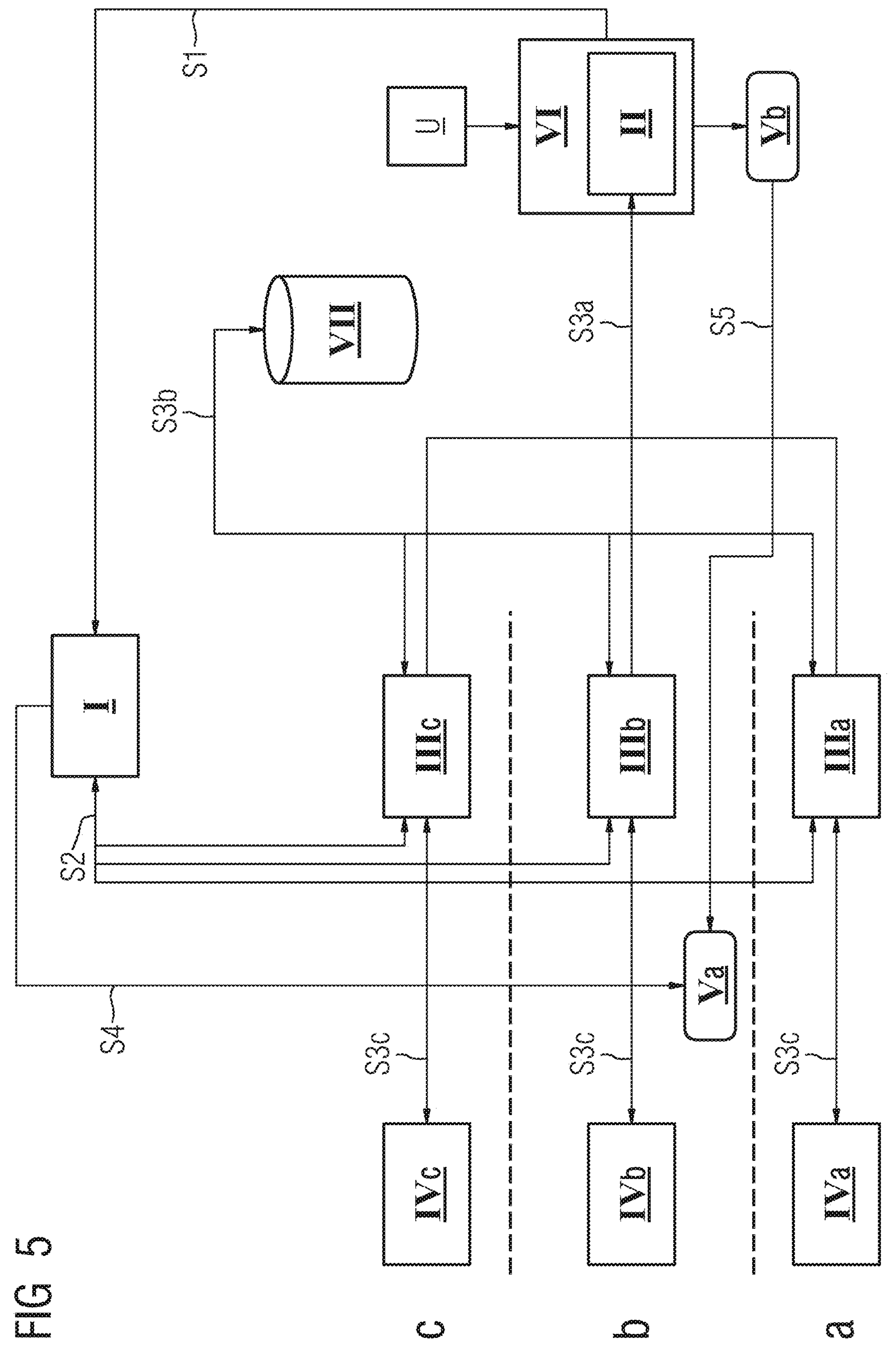

FIG. 1 shows a first exemplary embodiment of a method for determining an optimal execution location for an application, FIG. 2 shows a second exemplary embodiment of a method for determining an optimal execution location for an application, FIG. 3 shows a third exemplary embodiment of a method for determining an optimal execution location for an application, FIG. 4 shows a determining system for determining an optimal execution location for an application according to one or more example embodiments, and FIG. 5 shows an example of a data stream on execution of a method for determining an optimal execution location for an application according to one or more example embodiments.

DETAILED DESCRIPTION

At least one inventive achievement is described below, both in relation to the claimed apparatuses and also in relation to the claimed method. Features, advantages or alternative embodiments mentioned herein are also transferable similarly to the other claimed subject matter and vice versa. In other words, the device-related claims (which are directed, for example, to an apparatus) can also be further developed with the features described or claimed in relation to a method. The corresponding functional features of the method are thereby embodied by device-related modules.

Furthermore, the at least one inventive achievement of the object is described below, both in relation to methods and apparatuses for determining an optimal execution location for an application as well as in relation to methods and apparatuses for providing a trained function. Herein, features and alternative embodiments of data structures and/or functions in methods and apparatuses for the determining can be transferred to analogous data structures and/or functions in methods and apparatuses for adjusting/optimizing/training. Analogous data structures can herein be characterized, in particular, by the use of the qualifier “training”. Furthermore, the trained functions used in methods and apparatuses for determining an optimal execution location for an application can have been trained and/or adjusted and/or provided, in particular, by way of methods for providing the trained function.

One or more example embodiments of the present invention relates to a computer-implemented method for determining an optimal execution location for an application The method comprises a method step of determining available execution locations. Therein, each of the available execution locations provides an execution parameter. Therein, the at least one execution parameter provided by an available execution location is configured to quantify a suitability of the corresponding available execution location. The method further comprises a method step of determining the optimal execution location dependent upon the provided execution parameters. Therein, the optimal execution location is that execution location which is best suited according to the provided execution parameters for carrying out the application. The method further comprises a method step of providing the optimal execution location.

The application is configured to be executed on and/or by the execution location. In particular, the application can be used on data in order to generate a result dependent upon the data. In other words, the application can be configured to process data. The application can be, in particular, an application in a medical environment. For example, the application can be an application for the analysis and/or processing and/or reconstruction of image data and/or raw image data. Alternatively, the application can be an application for the analysis of laboratory data. Alternatively, the application can be an application for the analysis of work steps and/or examination steps in the medical environment. The data can therein be, for example, examination data. For example, the data can be image data and/or raw image data or laboratory data or treatment data, etc.

An execution location can therein provide a computing power for executing the application. The execution location can be, for example a local computing center and/or a cloud system. In other words, the execution location can be arranged in an edge layer or in a cloud layer. Alternatively, the execution location can be a local computer, for example a device, in particular a medical technology device. In particular, the execution location can be the medical technology device with which the data that is to be processed with the application is captured.

The data to which the application can be applied can be captured in a facility, for example, a hospital or a medical practice or a laboratory. The edge layer and/or the local computing center running in the edge layer is then arranged in the vicinity or in the facility. The cloud layer and/or the cloud system running in the cloud layer is thereby arranged remotely from the facility.

During determination of the available execution locations, the execution locations at which the application can be executed are determined.

If the application is to be used on data, in the available execution locations, only those execution locations can be taken into account at which the data can and/or may be conveyed and/or transmitted. Therein, for example, a transfer bandwidth can be taken into account. Alternatively or additionally, data protection guidelines in relation to the data and the corresponding execution locations can be taken into account.

Therein, each of the available execution locations provides at least one execution parameter. The execution parameter provided by an execution location therein states how suitable the execution location is for carrying out the application. In other words, the execution parameter provided by an execution location describes a property of the execution location. In particular, the property of the execution location can be quantified in the form of the execution parameter. In this way, a suitability of the execution location for carrying out the application can be quantified. Therein, the execution parameters provided are advantageously configured so that they can be compared with one another for the different execution locations. In other words, the at least one execution parameter can describe and/or quantify the same property for all the execution locations. For example, the at least one execution parameter of an execution location can specify how strongly the providing execution location is utilized and/or how much computation capacity is available. In this way, for example, the available computation capacity of the available execution locations can be compared.

The execution parameters can therein specify, in particular, absolute values for the property of the respective execution locations. Alternatively, the execution parameters can describe and/or quantify the property of the execution locations by way of a relative value. The execution parameters can be different for different properties.

If one or more execution locations cannot make the at least one execution parameter available, then in some embodiments of the invention, a default value can be provided instead. The default value can be, for example, an NaN value. In other words, the execution parameter of the corresponding execution locations can specify and/or comprise a default value.

In the method step of determining the optimal execution location, the optimal execution location is determined dependent upon the provided execution parameters. Therein, the execution location is determined as the optimal execution location which is best suited according to the provided execution parameters for carrying out the application. In other words, on determination of the optimal execution location, the execution parameters provided are compared and that execution location is determined as the optimal execution location which is best suited according to the execution parameters for carrying out the application. Therein, for example, account can be taken thereof at which execution location the result of the application can be provided soonest.

For example, that execution location can be determined as the optimal execution location which has the most computation capacity freely available if the execution parameters specify the freely available computation capacity of the execution locations. Alternatively or additionally, that execution location which can execute the application soonest if the application parameters specify when the computation capacity of the different execution locations is available can be determined as the optimal execution location.

In the method step of providing the optimal execution location, an information item regarding which execution location is the optimal execution location is provided. In particular, the information item can be provided to a user. Alternatively, the information item can be provided in such a way that the application is executed automatically directly at the optimal execution location. Therein, the information item can be provided in embodiments of the invention in such a way that the data to which the application is to be applied is directly conveyed and/or transmitted to the optimal execution location if the application is to be applied to data.

The inventor has discovered that the optimal execution location can be determined dependent upon the execution parameters. The inventor has discovered that therein a current situation, for example capacity utilization, of the execution locations at the time point at which the application is to be executed can be taken into account. The inventor has discovered that in this way, existing computation capacity and/or computing power can be exploited optimally. In this way, a provision of unnecessary computation capacity is reduced or hindered. This leads to a significant cost saving. In addition, it can be ensured that the application is executed as quickly as possible and that time delays due, for example, to waiting times until the execution of the application or to a retarded execution by reason of too little available computing power are prevented. Thus, the result generated by execution of the application can be provided as quickly as possible dependent upon the existing resources.

According to one or more example embodiments of the present invention, the method also comprises a method step of a provision by the application of at least one application parameter. Therein, the application parameter specifies a condition which must be met for execution of the application. Therein, in the method step of determining the available execution locations, each of the available execution locations makes available an execution parameter corresponding to the at least one application parameter. The method further comprises a method step of determining an optimal execution parameter. The optimal execution parameter is therein the execution parameter which best fulfils the condition specified by the at least one application parameter. The optimal execution location determined in the method step of determining the optimal execution location is that execution location which provides the optimal execution parameter.

In the method step of providing the at least one application parameter, the application parameter specific to the application is provided. The application parameter therein stipulates a condition which an execution location must fulfil so that the application can be executed there. For example, the application parameter can specify a minimal necessary computation capacity.

Therein, the execution parameters provided specify for each of the execution locations how well the corresponding execution location fulfils the condition stipulated by the execution parameter. Therein, the execution parameter of an execution location can specify, for example, solely whether the execution location fulfils the condition. Alternatively, the execution parameter can specify a value which can be compared with a value given in the condition of the application parameter. In particular, for this, the execution parameter can specify an absolute value which can be compared with the value given by the condition of the application parameter. Alternatively, the execution parameter can specify a relative value which specifies, for example, to what proportion the corresponding execution location fulfils the condition specified by the application parameter.

In the method step of determining the optimal execution parameter, that execution parameter is determined which best fulfils the condition established and/or stipulated by the application parameter. Therein, in particular, execution parameters which specify a default value are not taken into account.

In the method step of determining the optimal execution location, that execution location which has provided the previously determined optimal execution parameter can then be determined as the optimal execution location.

The inventor has discovered that the selection of the optimal execution location can also be dependent upon application-specific stipulations and/or conditions. For example, for different applications, different execution locations can be determined as optimal for different applications. The inventor has discovered that this problem can be solved by taking account of at least one application-specific condition. The inventor has discovered that for this purpose, with regard to the execution parameters provided, an application parameter stipulating the condition can be provided.

According to one or more example embodiments of the present invention, the method also comprises a method step of carrying out the application at the optimal execution location.

Therein, the execution of the application can be initiated and/or started, in particular, by the provision of the optimal execution location. In particular, the execution of the application can be initiated manually or automatically at the optimal execution location.

In some embodiments of the invention, if the application is to be applied to data, the execution of the application can comprise a conveying of the data, to which the application is to be applied, to the optimal execution location. In particular, the application can be applied to the data, and/or can process the data, at the execution location.

The inventor has discovered that for execution of the application, a manual selection of the execution location is no longer necessary. In this way, immediately without any time delay, when the optimal execution location has been determined, the application can be started at the optimal execution location. The inventor has discovered that in this way, applications can be distributed automatically to different execution locations, so that the available resources of the execution locations can be optimally utilized. The inventor has also discovered that alternatively, the application can be executed manually by a user and/or the execution can be initiated at the optimal execution location.

According to one or more example embodiments of the present invention, the application is executed in the method step of the execution of the application in a container at the optimal execution location.

In other words, the application can be executed in the container independently of the software installed at the optimal execution location. In other words, the container offers an independent system which is configured to execute the application.

In particular, the application and/or a piece of software necessary for executing the application is not necessarily installed at the optimal execution location.

The inventor has discovered that by way of the execution in a container, the application and/or the software necessary for executing the application needing to be installed at every possible execution location can be avoided. In this way, a flexibility can be ensured on execution of the application and on use of the execution locations.

According to one or more example embodiments of the present invention, the at least one application parameter specifies a condition in respect of one of the following properties: data access speed, network speed, storage location for data, data quantity, current and/or predicted resource availability, costs of the execution and/or of the data storage, data security requirements, performance requirements, latency. Therein, the execution parameters comprise a specific value for the condition specified by the corresponding application parameters.

The list is therein not to be understood as conclusive. Alternatively, the at least one application parameter can specify a condition in relation to a property not included by the list.

The data access rate is relevant, in particular, if the application is applied to data. Therein, the data access rate specifies how quickly the data can be accessed from an execution location to the location at which data is captured and/or stored. In other words, the data access rate can specify how rapidly the data can be conveyed to the execution location. Therein, the application parameter can stipulate a minimal data access rate as a condition. Alternatively, the application parameter can stipulate a maximum timespan for conveying the data, from which together with the expected data quantity, the minimal data access rate can then be determined.

The network rate states how fast a connection is between a user interface at which a user can view the result of the application and the execution location, for example. The application parameter can then specify as a condition a minimum network rate or a minimum timespan until the provision of the result.

The data access rate is relevant, in particular, if the application is applied to data. The storage location of the data specifies where the data to which the application is to be applied is placed and/or stored. In other words, the storage location specifies from where the data must be conveyed for applying the application at the execution location. This application parameter can be evaluated, in particular, in combination with the data access rate.

The data quantity is relevant, in particular, if the application is applied to data. The data quantity specifies how much data must be conveyed to the execution location. The data quantity can therein be specified in a typical format for a data variable, for example, in bytes. This application parameter can be evaluated, in particular, in combination with the data access rate.

The predicted and/or actual resource availability specifies what computing power and/or computation capacity will be available at a particular future time point and/or is currently available at an execution location. Therein, the future time point can correspond to the time point at which the application is expected to be executed. Therein, the application parameter can specify a minimal required computing power and/or computation capacity as a condition.

The costs of the execution specify the costs of using an execution location. Therein, the application parameter can specify, for example, a maximal cost limit as a condition. The costs can be determined dependent upon the required and/or used computing power and/or dependent upon the time required for execution of the application.

The costs of the data storage can specify, in particular, how much the storage of the data to which the application is to be applied costs at the execution location during the utilization of the application. Therein, the costs can relate to a required timespan for executing the application. The application parameter can therein stipulate a maximum cost limit for storing the data.

The data security requirements are relevant, in particular, if the application is applied to data. The data security requirements specify, in particular, which security information items an execution location to which the data is conveyed for utilizing the application must meet. For example, the application parameter for the data security requirements can stipulate that the execution location is arranged within a particular spatial limit, for example, within a particular country or a particular group of countries. Alternatively or additionally, the application parameter for the data security can specify other security-relevant guidelines and/or conditions such as, for example, protection against data hacking, etc.

The performance requirement can stipulate a generally needed requirement on the performance of the execution location. The performance can therein specify at least indirectly how quickly the data can be processed.

The latency can specify a maximum delay, for example due to the transfer of the data from the location at which it is captured and/or stored to the execution location. Alternatively or additionally, the latency can specify a maximum required time to execute the application. Alternatively or additionally, the latency can stipulate a maximum required time for providing a result determined with the application.

The execution parameters provided by the available execution locations therein provide specific values which can be compared with the condition stipulated by the corresponding application parameters in relation to one of the aforementioned specific embodiments of the execution parameters. In particular, these specific values can be absolute or relative as described above.

The inventor has discovered that a large number of properties of the execution locations can be taken into account when determining the optimal execution location. The inventor has discovered that, in particular for different applications, different application parameters and execution parameters can be taken into account.

According to one or more example embodiments of the present invention, in the method step of providing the at least one application parameter, more than one application parameter is provided. Therein, in the method step of determining available execution locations, from the available execution locations for each application parameter provided, a corresponding execution parameter is provided.

In other words, more than one condition can be stipulated by the application by way of the provided application parameter, that is to be taken into account in the selection of the optimal execution location. In particular, the application parameters can be related to one another.

A corresponding execution parameter can then be provided by each available execution location for each application parameter provided, said parameter specifying for the application parameter a specific absolute or relative technical value for the corresponding execution location.

If, for one or more execution locations for one or more application parameters, no specific technical value can be provided as an execution parameter, a default value, for example an NaN value is provided as the execution parameter instead.

The inventor has discovered that often more than one application parameter must be taken into account in the selection of the optimal execution location. The inventor has discovered that, in this way, different aspects can be taken into account when determining the optimal execution location. The inventor has discovered that in this way, for example, both cost-relevant aspects such as, for example, the costs for the execution of the application at an execution location and time-relevant aspects such as for example, the performance of an execution location can be taken into account equally when determining the optimal execution location.

According to one or more example embodiments of the present invention, a weighting factor is associated with the application parameters. Therein in the method step of determining the optimal execution location, the fulfilment of the condition stipulated by the application parameters is taken into account by the execution parameters provided by the execution locations according to the weighting factors of the application parameters.

Therefore a weighting factor is associated with each application parameter. The weighting factors are therein formed so that they are comparable with one another. For example, the weighting factors can specify a relevance of the application parameter on a scale between 0 and 1. Therein, 0 can signify that the application parameter associated with the weighting factor should not be taken into account and/or is not relevant. Therein, 1 can signify that the application parameter associated with the weighting factor should be taken into account to the maximum extent and/or is maximally relevant. Two application parameters the weighting factors of which are similar and/or identical are taken into account equally when determining the optimal execution location.

On determination of the optimal execution location, account is then also taken of which execution location best fulfils the conditions stipulated by the application parameters on the basis of the execution parameters provided by it. In addition, account is taken on the basis of the weighting factors of how relevant the application parameters and/or the conditions stipulated by the application parameters actually are for the determination of the optimal execution location.

In this way, it can be stipulated, for example, that the application parameter which stipulates the maximal costs for the execution of the application at an execution location is less severely weighted than the application parameter which stipulates the data transfer rate. In this example, therefore, by way of the corresponding selection of the weighting factors, it can be stipulated that the costs play a smaller role when determining the optimal execution location than the time which is needed for the execution of the application. Arbitrary alternative examples are naturally conceivable.

The inventor has discovered that on the basis of the weighting factors, it can be stipulated which application parameter and/or which condition is to be taken into account to what extent when determining the optimal execution location. The inventor has discovered that in some applications, different properties and thus different conditions stipulated by the application parameters are to be weighted to different extents. Thus, for example, the incurred costs can be taken into account to a greater extent by way of the execution of the application in one application than in another application.

According to one or more example embodiments of the present invention, the application is configured for the processing of data. Therein, the weighting factors depend upon the data which is to be processed by the application.

During execution, the application can therein be applied to the data as described above. In other words, the application can process the data during the execution. Therein, the data is the input data for the application. The application therein determines a result dependent upon the data to which it is applied.

The weighting factors that are associated with the application parameters provided by the application can therein depend upon the data to which the application is to be applied. In other words, the weighting factors can thus be different for the same application, dependent thereupon to which data the application is to be applied.

The weighting factors can be, in particular, manually adapted. Alternatively, the weighting factors can be automatically adapted. For example, the weighting factors can be adapted dependent thereupon with which device and/or system the data is captured. Alternatively or additionally, the weighting factors can be adapted dependent thereon where the data is captured, for example, in which department of a hospital.

The inventor has discovered that the conditions under which an application is to be executed can depend upon the data on which it is to be utilized. In the medical environment, for example, costs are to be given a lower weighting in an emergency situation than in a routine examination. In this way, it can be ensured, for example, that the image data of a patient with a suspected stroke are evaluated more rapidly and independently of the incurred costs by way of utilizing an application than, for example, the image data of a patient that has been captured from the patient in the course of a routine aftercare examination. Therein, in both cases, the same application can be utilized, for example, for reconstructing the image data.

According to one or more example embodiments of the present invention, the application is configured for the processing of data. Therein, the at least one application parameter depends upon the data which is to be processed by the application.

In other words, the condition stipulated by the application parameter depends upon the data that is to be processed by the application and/or to which the application is to be applied. In other words, although the application parameter can relate to the same execution parameter for different data and/or can stipulate a condition for the same execution parameter, the condition can be different for different data. For example, a minimal network speed stipulated by the application parameter can be different for different data.

The application parameter can therein be adapted manually by a user to the data to be processed. Alternatively, the application parameter can be adapted to the data automatically. For example, the application parameter can be adapted dependent upon a data size and/or a data quantity of the data to be processed and/or dependent thereupon with which device and/or system the data is captured, etc.

The inventor has discovered that by way of the adaptation of the application parameter, the different requirements of different data can be taken into account. For example, it is possible to take into account that larger data quantities to be conveyed from the storage location or the capture location to the execution location require a larger bandwidth than smaller data quantities if both data quantities are to be conveyed in approximately the same timespan. In particular, the corresponding application parameter which stipulates a condition for the bandwidth can then be adapted to the data such that all the data can be conveyed in a maximal timespan. It is taken into account that for smaller data quantities, no unnecessarily large bandwidth is required. Naturally, application-specific conditions can be also established for other properties by adapting the application parameters. Therein, for example, it can be taken into account in which context the corresponding application is typically utilized, for example, in an emergency situation or in a routine situation.

According to one or more example embodiments of the present invention, the method step of determining the available execution locations is carried out at a first time point. Therein, a method step of an execution of the application at the optimal execution location is planned at a second time point. Therein, the first time point lies temporally before the second time point. Therein, the method step of determining the available execution locations comprises a method step of determining the at least one execution parameter for the second time point for each execution location.

Thus the method step of determining the at least one execution parameter for the second time point is carried out for each available execution location.

In the method step of determining the at least one execution parameter, at the first time point, the execution parameter for the second time point is thus determined. In other words, the execution parameter for the second time point is predicted at the first time point. In particular, therein for each available execution location, the execution parameter for the second time point is predicted.

If the execution parameter of an execution location cannot be predicted for the second time point, in place thereof, a default value, for example an NaN value, is specified for the execution parameter.

The method step of execution of the application can therein be configured as described above.

The inventor has discovered that in this way, the execution of the application can be planned in advance. The inventor has discovered that in this way, account can be taken of the fact that the execution parameter can be configured to be temporally variable. The inventor has further discovered that in this way, the execution of a plurality of applications on the different execution locations can be planned in advance and optimized. The inventor has discovered that by way of prior knowledge, for example, regarding a capacity utilization, the optimal execution location can be determined in advance. The inventor has discovered that in this way, for example, in associations, for example clinic associations, across different time zones, knowledge regarding a time of day-dependent capacity utilization can be used in order to be able to determine the optimum execution location in advance.

According to one or more example embodiments of the present invention, the execution parameters of the available execution locations are determined for the second time point for each execution location in the method step of determining the at least one execution parameter of the execution location by applying a trained function to the at least one execution parameter from the past corresponding to the at least one execution parameter.

In the method step of applying the trained function, via the first trained function, on the basis of the input data, the output data is generated.

In general, a trained function emulates cognitive functions that link human thinking to humans. In particular, by way of training based upon training data, the trained function can adapt to new circumstances and can recognize and extrapolate patterns.

In general, parameters can be adapted to a trained function via training. In particular, for this purpose, a supervised training, a semi-supervised training, an unsupervised training, a reinforcement learning and/or an active learning can be used. Furthermore, representation learning, also known using an alternative expression as “feature learning”, can be used. In particular, the parameters of the trained functions can be adapted iteratively by way of a plurality of training steps.

In particular, a trained function can comprise a neural network, a support vector machine, a random tree and/or a decision tree and/or a Bayesian network, and/or the trained function can be based upon k-means clustering, Q-learning, genetic algorithms and/or association rules. In particular, a trained function can comprise a combination of a plurality of uncorrelated decision trees and/or an assembly of decision trees (a random forest). In particular, the trained function can be determined via XGBoosting (Extreme Gradient Boosting). In particular, a neural network can be a deep neural network, a convolutional neural network or a convolutional deep neural network. Furthermore, a neural network can be an adversarial network, a deep adversarial network and/or a generative adversarial network. In particular, a neural network can be a recurrent neural network. In particular, a recurrent neural network can be a network with long-short-term memory (LSTM), in particular, a gated recurrent unit (GRU). In particular, a trained function can comprise a combination of the described approaches. In particular, the approaches described here are specified for a trained function network architecture of the trained function.

As described above, the method step of determining the at least one execution parameter for the second time point is executed for the available execution locations individually and/or separately and/or independently of one another. The method step for an execution location will now be described. Therein, the method step is configured similarly for the other execution locations. Therein, the trained function can be specifically adapted and/or trained for each execution location. In other words, for each execution location, an individual trained function can be utilized.

In the method step of determining the at least one execution parameter, for the second time point, the trained function is applied to one or more execution parameters from the past. On the basis of the execution parameter(s) from the past, the execution parameter for the second time point is determined. “From the past” means that the execution parameter(s) was/were determined and/or captured before or at the first time point. In particular, a temporal sequence of the execution parameter can have been captured for the execution location up to the first time point. For this purpose, in specific time intervals, the execution parameter can be captured and/or determined and/or read off up to the first time point. The execution parameters of the past therein relate to the same property of the execution location as the execution parameter that is to be determined for the second time point. By using the trained function on the execution parameter(s) from the past, the execution parameter for the second time point can be determined.

The inventor has discovered that with the aid of a trained function for an execution location, the execution parameter for the second time point can be predicted. The inventor has discovered that therein, on the basis of information from the past, an information item relating to the future, that is, the second time point can be derived.

According to one or more example embodiments of the present invention, the execution parameters of the available execution locations are determined for the second time point for each execution location in the method step of determining the at least one execution parameter of the execution location by applying a trained function to the at least one execution parameter from the past corresponding to the at least one execution parameter and an information item relating to an execution of other applications at the second time point at the available execution locations.

The trained function can therein be configured as described, in general, above.

In particular, the utilization of the trained function is configured mainly as described above. In contrast to the above description, the trained function is additionally applied to an information item in relation to an execution of other applications on the available execution locations at the second time point. The information item can therein specify which applications are to be executed at which available execution location at the second time point and what computing power is used and/or consumed by the other applications during execution.

The inventor has discovered that in this way, previously "planned" computation capacities and/or computing power levels can be taken into account. In other words, the inventor has discovered that an already existing plan for the second time point can be taken into account. The inventor has discovered that in this way, previously known influences on the execution parameters can be taken into account at the second time point.

According to one or more example embodiments of the present invention, the application is configured for the processing of data. Therein, the data is captured at a third time point. Therein, the third time point lies temporally before the second time point. Therein, the first time point lies temporally before the third time point. Or therein, the first time point is identical to the third time point. Therein, the data is transmitted on capture directly to the optimal execution location.

The application can therein be configured to process the data as described above. In particular, the application can be configured to be applied to the data as described above. The data can be configured as described above.

The third time point at which the data is captured advantageously lies between the first and the second time point or is identical to the first time point. In particular, therefore, at the third time point, the execution parameters for the second time point for the available execution locations are already determined and/or predicted. In particular, therefore, the optimal execution location can already be determined. In other words, on capture of the data at the third time point, it is already known what the optimal execution location is. It is therefore already known at which execution location of the available execution locations, the application should be utilized on the data. Thus, the data can be transmitted and/or conveyed on capture directly to the optimal execution location. In particular, the data is then advantageously already available at the second time point at the optimal execution location and the application can be utilized directly on the data and/or the application can process the data directly.

The inventor has discovered that by way of the predictive transmission and/or transference of the data, time can be saved. In particular, a part of the data can already be transferred and/or transmitted during the conveying. In this manner, it can be ensured that directly at the planned second time point, the processing of the data by utilizing the application on the data can be begun. The inventor has discovered that this is possible, in particular, if the execution parameters of the execution locations for the second time point are predicted so that at the time point of capturing the data, it is known which execution location is the optimal execution location and the data can be conveyed and/or transmitted accordingly directly upon capture.

According to one or more example embodiments of the present invention, the application is a medical application.

In particular, the application is an application from the medical environment. For example, the application can be an application in imaging, in laboratory diagnostics, in treatment, in radiation therapy, etc.

For example, the application can be an application for the reconstruction and/or processing and/or analysis of image data, in particular medical image data.

Alternatively, the application can be an application for the analysis and/or evaluation of laboratory data. In other words, the application can be configured to analyze laboratory data and in creating a diagnosis on the basis of the laboratory data.

Alternatively, the application can be configured for treatment planning. Therein, the application can be configured to be utilized on patient data and/or previously performed examinations and/or interventions on a patient and/or on existing diagnoses, etc. Therein, the application can be, for example, a treatment proposal, that is in particular, a proposal relating to the further procedure in relation to a further treatment of the patient.

Alternatively, the application can be configured for radiation therapy planning. Therein, the application can be configured to determine an irradiation plan. Therein, the application can be applied to image data of a patient. On the basis of image data, the application can determine an irradiation plan adapted to the patient.

Many other alternative or complementary applications in the medical environment are conceivable.

The inventor has discovered that the method described is particularly suitable, in particular, in the medical environment. The inventor has discovered that there is a great deal of time pressure there to evaluate data in a timely manner. The inventor has discovered that this can be optimized with the method described.

According to one or more example embodiments of the present invention, the available execution locations can correspond to locations from the following list: a cloud system, an edge system, a local computer, a modality, a local or central computing center.

This list is not to be understood as exhaustive. The execution locations can also have alternative manifestations.

The modality can therein be, in particular, a device and/or system and/or a medical technology device with which the data described above can be captured. The modality can be, for example, a computed tomography device or a magnetic resonance device or an X-ray device or a C-arm device or a mammography device or a positron emission tomography device or a single photon emission computed tomography device or a laboratory diagnostic system, etc.

The inventor has discovered that a plurality of different possible execution locations for the execution of the application can be used. The inventor has discovered that all the possible available computation capacities can be brought together and utilized. The inventor has discovered that in this way, the available computation capacities can be exploited optimally. The inventor has discovered that with the method described above, even given the number of possible and/or available execution locations, it can be ensured that only the execution locations suitable, for example, with regard to data security, can be considered for the execution of the application.

According to one or more example embodiments of the present invention, after the determination of the optimal execution location, a user receives access to the optimal execution location for execution of the application.

In particular, the user can then control the execution of the application described above. In other words, the user can initiate and/or start the execution of the application. In particular, the user can specify at the optimal execution location which data the application should process and/or on which data the application should be used.

The inventor has discovered that, by way of the access to the optimal execution location, a user is given the possibility of intervening in the execution of the application and of controlling it. The inventor has further discovered that a targeted access to only the optimal execution location can be assured. The inventor has discovered that in this way, a misuse by unnecessary access permissions can be prevented.

One or more example embodiments of the present invention further relates to a computer-implemented method for providing a trained function. The method comprises a method step of receiving training input data, wherein the training input data comprises at least one training execution parameter before a time point before a second training time point. The method also comprises a method step of receiving training output data, wherein the training output data comprises at least one actual training execution parameter at the second training time point. Wherein the training input data and the training output data relate to one another. The method further comprises a method step of training a function on the basis of the training input data and the training output data. The method further comprises a method step of providing the trained function.

The training input data therein relates, in particular, to one of the properties of an execution location described above. The execution location is therein configured as described above. The training input data therein describes, in the form of a training execution parameter, the property before the second training time point. Therein, the training input data can comprise a training execution parameter which describes the property of the execution location before the second training time point. Alternatively, the training input data can comprise a temporal sequence of training execution parameters which describe a temporal sequence and/or a temporal change of the property before the second training time point.

The training output data comprises the actual training execution parameter at the second training time point.

By using the function on the training input data, preliminary training output data is determined which comprises a preliminary training execution parameter at the second training time point.

In the method step of training, the received training output data and the preliminary training output data are compared. Dependent upon this comparison, at least one parameter of the function is adapted such that on a renewed application of the function to the training input data, the new preliminary training output data better matches the received training output data.

This method step can be carried out multiple times iteratively until a termination criterion is reached. In particular, the method step can be applied to a plurality of training input data and training output data.

The termination criterion can be, for example, an exceeding of a maximum number of iterations. Alternatively or additionally, the termination criterion can be an exceeding of a minimum deviation between the received training output data and the preliminary training output data.

One or more example embodiments of the present invention further relates to a determination system for determining an optimal execution location for an application comprising an interface and a computing unit. Therein, the interface and/or the computing unit is configured for determining available execution locations. Therein, the interface is configured to receive at least one execution parameter from each of the available execution locations. Therein, the at least one execution parameter provided by an available execution location is configured to quantify a suitability of the corresponding available execution location. Therein, the computing unit is also configured for determining the optimal execution location. Therein, the optimal execution location is that execution location which is best suited according to the provided execution parameters for carrying out the application. Therein, the interface is also configured for providing the optimal execution location.

A determining system of this type can be configured, in particular, to execute the method described above for determining an optimal execution location for an application and its aspects. The determining system is configured to carry out this method and its aspects in that the interface and the computing unit are configured to execute the corresponding method steps.

One or more example embodiments of the present invention also relates to a computer program product having a computer program, and also a computer-readable medium. A realization largely through software has the advantage that conventionally used determining systems can also easily be upgraded by way of a software update in order to operate in the manner described. Such a computer program product can comprise, apart from the computer program, possibly additional constituents, such as, for example, documentation and/or additional components as well as hardware components, for example, hardware keys (dongles, etc.) for using the software.

One or more example embodiments of the present invention relates also, in particular, to a computer program product with a computer program which is directly loadable into a memory store of a determining system, having program portions in order to carry out all the steps of the method described above for determining an optimal execution location for an application and its aspects when the program portions are executed by the determining system.

In particular, one or more example embodiments of the present invention relates to a computer-readable storage medium on which program portions readable and executable by a determining system are stored in order to execute all the steps of the method described above for determining an optimal execution location for an application and its aspects when the program portions are executed by the determining system.

FIG. 1 shows a first exemplary embodiment of a method for determining an optimal execution location for an application.

In a method step of determining DET-1 available execution locations, execution locations are determined which are available for executing the application. In other words, execution locations at which the application can be executed are determined.

During the determination DET-1 of available execution locations, each of the available execution locations provides at least one execution parameter. The execution parameter of an execution location is therein configured to characterize the execution location and/or to describe the execution location. Therein, the at least one execution parameter of an execution location is configured to quantify a suitability of the corresponding available execution location.

Therein, the execution parameters provided by the different execution locations are comparable with one another. In particular, by way of the at least one execution parameter, at least one property is described and/or characterized and/or quantified for all the execution locations.

If one or more of the available execution locations are able to provide none of the execution parameters describing the corresponding property, for the execution parameter, a default value, for example, an NaN value can be provided instead.

In a method step of determining DET-2 the optimal execution location, the optimal execution location is determined dependent upon the provided execution parameters. Therein, the optimal execution location is that execution location of the available execution locations which is best suited for carrying out the application according to the application parameters provided.

In a method step of providing PROV-1 the optimal execution location, an information item regarding which execution location has been determined as the optimal execution location is provided. Therein, the information item can be configured such that a user is informed regarding which is the optimum execution location. Alternatively or additionally, the information item can be configured such that the application is executed automatically at the optimal execution location on the basis of the information.

In an optional method step of an execution APP of the application, the application is executed at the optimal execution location. Therein the application can be executed manually by way of a user input. In other words, the execution APP of the application can be started and/or initiated manually by way of a user input. Alternatively, the application can be executed at the optimal execution location automatically. In other words, alternatively, the execution APP of the application can be started and/or initiated at the optimal execution location automatically.

In some embodiments of the invention, the application is configured, on execution, to be used on data. In other words, the application can be configured to process data during the execution. Therein, by executing the application dependent upon the data, a result can be generated.

In some embodiments of the invention, in the method step of execution APP, the application can be executed in a container at the optimal execution location. Therein, the application can be executed in the container without having to be installed directly at the optimal execution location. In other words, the application can be executed in the container at the optimal execution location independently of the software and/or operating system installed there.

In some embodiments of the invention, the application is a medical application. For example, the application can be an application in imaging and/or in laboratory diagnostics and/or in treatment and/or in radiation therapy. Thus, the application can be configured, for example, for reconstructing and/or analyzing image data captured in a medical context. Alternatively, the application can be configured to analyze laboratory data and, for example, on the basis of the laboratory data, to create a diagnosis or to recommend further investigations. Laboratory data can comprise, for example, an analysis of body fluids or other bodily properties of a patient. Alternatively, the application can be configured to provide support in planning therapy for a patient. For this purpose, the application can be configured, for example, to analyze patient data and/or already captured image data and/or laboratory data and to generate proposals regarding a further treatment and/or examination. Alternatively, the application can be configured to determine an irradiation plan for a patient. For this purpose, the application can be applied to image data of the patient.

As is clear in the description, the data on which the application can be used can therefore be configured differently. In particular, different applications can be utilized on different data. For example, the data can be image data, laboratory data, patient data, etc.

In some embodiments of the invention, the execution locations provided in the method step of providing the available execution locations can be locations from the following list: a cloud system, an edge system, a local computer, a modality, a local or central computing center.

The modality can therein be the device, in particular, the medical technology device and/or the system with which the data on which the application is to be utilized and/or that is to be processed with the application can be captured. The medical technology device can be, for example, one from the following list: a computed tomography device, an X-ray device, a C-arm device, a mammography device, a magnetic resonance tomography device, a positron emission tomography device, a single photon emission computed tomography device, a laboratory system, etc.

The edge system can therein be arranged, in particular, within a network in which the data is captured and/or stored.

The cloud system can be provided, in particular, by a cloud provider. Therein, different cloud systems can be provided by different cloud providers. The different cloud systems of different cloud providers can therein differ in their provided execution parameters. For example, the different cloud systems can generate different costs on execution of the application.

In a further optional embodiment of the invention, after the determination DET-2 of the optimal execution location, a user receives access to the optimal execution location for execution of the application. By way of the access, the user can start and/or initiate the execution of the application. Alternatively or additionally, the user can monitor the application.

FIG. 2 shows a second exemplary embodiment of a method for determining an optimal execution location for an application.

The method steps of determining DET-1 the available execution locations, determining DET-2 the optimal execution location and providing PROV-1 the optimal execution location are configured similarly to the description in relation to FIG. 1. The optional exemplary embodiments which have been described in relation to FIG. 1 can also be transferred to the second exemplary embodiment described below.

In a further method step of a provision PROV-2 of at least one application parameter, at least one application parameter is provided by the application. The application parameter specifies a condition which is to be met by the execution location at which the application is to be executed. The application parameter thus specifies a condition for the property of the optimal application parameter.

In the method step of determining DET-1 available execution locations, each of the available execution locations provides at least one execution parameter corresponding to the application parameter. In other words, each of the available execution locations provides an execution parameter which describes and/or quantifies a specific value for the property of the corresponding execution location, said property being contingent upon the application parameter. The specific value can therein be absolute or relative.

In a method step of determining DET-3 an optimal execution parameter, that execution parameter which best fulfils the condition stipulated by the application parameter is determined from the provided execution parameters. Therein, those execution parameters provided which characterize the same property of the execution locations as the at least one application parameter are taken into account.

The optimal execution location determined in the method step of determining DET-2 the optimal execution location is the optimal execution location which has provided the optimal execution parameter.

In some embodiments of the invention, the at least one application parameter stipulates a condition in respect of one of the following properties: data access speed, network speed, storage location for data, data quantity, current and/or predicted resource availability, costs of the execution and/or of the data storage, data security requirements, performance requirements, latency.

The execution parameters provided then give a specific value for the condition stipulated by the application parameter. In other words, the execution parameters provided specify a specific value for the property of the respective execution location conditional upon the application parameter.

Therein the property can be specific for an execution location, for example, the performance or the costs. Other properties can be independent of the execution locations, such as the storage location of the data on which the application is to be utilized. In combination with properties specific to an execution location, these properties can provide further specific information items for the execution location. For example, from the storage location of the data and the data access rate specific to an execution location, it can be derived how rapidly the data can be conveyed to the execution location.

In some embodiments of the invention, in the method step of providing PROV-2 the at least one application parameter, more than one application parameter is provided. In other words, conditions relating to more than one property of the execution location are stipulated. Therein, in the method step of determining DET-1 available execution locations from the available execution locations, for each application parameter provided, a corresponding execution parameter is provided. In other words, each available execution location provides at least as many execution parameters as application parameters that are provided. Therein, at least one execution parameter of an execution location gives a specific value for a property conditional upon an application parameter. If an execution location for an application parameter is unable to specify any corresponding execution parameter and/or any specific value, the execution parameter specifies a default value, for example, an NaN Wert and/or the execution parameter specifies it.

In one embodiment of the invention, a weighting factor is associated with each of the application parameters. In particular, a weighting factor is associated with each application parameter. The weighting factor of an application parameter specifies how relevant the fulfilment of the condition established by the application parameter by way of the execution location is for the execution of the application. The weighting factors can assume a value, for example, of between 0 and 1. Therein, 0 means that the corresponding application parameter is not relevant for the execution of the application and thus for the determination of the optimal execution location. A weighting factor of 1 means that the fulfilment of the condition stipulated by the corresponding application parameter is of great relevance for the determination of the optimal execution location for executing the application. In the method step of determining DET-2 the optimal execution location, accordingly the fulfilment of the conditions stipulated by way of the application parameters provided by the execution parameters is taken into account and/or weighted according to the weighting factors. The fulfilment of the condition of an application parameter with a small weighting factor therefore weighs not so much on selection of the optimal execution location as the fulfilment of a condition of an application parameter with a large weighting factor. In the examples given above, "small" can mean close to 0 or 0 and "large" can mean close to 1 or 1.

In some embodiments of the invention, the weighting factors of the application parameters depend upon the data that is to be processed with the application and/or to which the application is to be applied. In other words, the weighting factors of the application parameters of the same application for a processing of different data can be different. For example, the application can be an image processing application. In particular, the application can be an application for the reconstruction of computed tomography image datasets. An application parameter of the application can stipulate, for example, a maximum latency. Another application parameter of the application can specify as a condition how much, as a maximum, the execution of the application may cost. If, for example, a computed tomography image dataset of a patient with a suspected stroke is to be reconstructed by applying the application to the image dataset, the weighting factor of the latency can be greater than that of the costs. If a computed tomography image dataset is to be reconstructed as part of a routine examination, for example, during the aftercare of a patient by utilizing the application on the image dataset, the weighting factor of the costs can be greater than the weighting factor of the latency. In this way, it is possible to take into account that in an emergency situation, the time plays a greater part than the costs, whereas in a routine examination and/or a checkup examination, typically no time pressure exists and thus the costs can be taken into account more strongly.

In some embodiments of the invention, the at least one application parameter can depend upon the data that is to be processed with the application and/or to which the application is to be applied. In other words, the condition which is established in relation to a property of the execution location for executing the application can be adapted via the at least one application parameter to which the data to be processed is adapted. Alternatively or additionally, the application parameters can also be different, dependent upon the data that is to be processed. In other words, dependent upon the data to be processed, different application parameters relating to different properties can be provided for the application. In this way, it is possible to take into account that for different data, different properties of the execution location play a role. For example, the condition for the latency can be configured differently dependent upon the data to be processed. In other words, the application parameter which stipulates a condition for the latency can be configured differently, dependent upon the data. The application parameter can therein stipulate, for example, a maximum duration for the latency. This duration can be shorter in the processing of newly captured data by way of the application than if data which has already been stored in the database for some time is to be processed and obviously does not have to be processed in a time-critical manner.

FIG. 3 shows a third exemplary embodiment of a method for determining an optimal execution location for an application.

The method steps of determining DET-1 the available execution locations, determining DET-2 the optimal execution location and—providing PROV-1 the optimal execution location are configured similarly to the description in relation to FIG. 1. The method steps of providing PROV-2 at least one application parameter and determining DET-3 an optimal application parameter are configured similarly to the description in relation to FIG. 2. The optional exemplary embodiments which have been described in relation to FIGS. 1 and 2 can also be transferred to the third exemplary embodiment described below.

In the exemplary embodiment described, the method step of determining DET-1 the available execution locations is carried out at a first time point. The method step of the execution APP of the application at the optimal execution location is planned at a second time point. The first time point is therein before the second time point.

The method step of determining DET-1 the available execution locations therein comprises, for each of the available execution locations, a method step of determining DET-4 the at least one execution parameter of the execution location for the second time point. In other words, at the first time point, for each available execution location, it is determined how the corresponding execution parameter will be at the second time point. In other words, the value of the execution parameter for each execution location is determined at the second time point. In other words, for each execution location, the correspondingly provided at least one execution parameter for the second time point is predicted at the first time point. As described above, if an execution parameter cannot be predicted, the value of the execution parameter and/or the execution parameters is replaced by a default value, for example, an NaN value.

In particular, in this way, as soon as at the first time point, on the basis of the predicted, provided execution parameters, the optimal execution location for the application can be determined at the second time point.

In some embodiments of the invention, for each execution location, the at least one execution parameter can be determined in the method step of determining DET-4 the at least one execution parameter by applying a trained function to execution parameters from the past corresponding to the execution parameter. As described above, the at least one execution parameter for the second time point is determined. The trained function is therein applied to at least one corresponding execution parameter which has been captured before or at the first time point. In particular, the trained function can be applied to a temporal sequence of corresponding execution parameters which have been captured before or at the first time point. Therein, "corresponding" means that the execution parameters relate to and/or describe and/or characterize the same property of the execution location. "From the past" means that the execution parameters were captured "from the past" before or not later than at the first time point. In other words, the trained function can thus be configured, on the basis of a known behavior of the property of the execution location to predict the execution parameter for the second time point. The trained function can therein be configured and trained as described above. The trained function is therein individual for each execution location and each execution parameter, in particular different. In other words, the training of the trained function is adapted to the execution location and the execution parameter.

In some embodiments of the invention, the data that is to be processed with the application is captured at a third time point. Therein, the third time point lies between the first and the second time point or is identical to the first time point. As described above, by way of the prediction and/or determination of the execution parameters for the second time point, as soon as at the first time point, the optimal execution location for executing the application at the second time point is determined. It is therefore already known, on capture of the data at the third time point, at which execution location the data is to be processed at the second time point and/or at which execution location the application is to be executed and therein is to be utilized on the data. Thus, the data can be transmitted and/or conveyed on capture directly to the optimal execution location.

FIG. 4 shows a determining system SYS for determining an optimal execution location for an application.

The determining system SYS for determining an optimal execution location for an application is configured to execute a method according to one or more example embodiments of the present invention for determining an optimal execution location for an application. The determining system SYS comprises an interface SYS.IF, a computing unit SYS.CU and a memory unit SYS.MU.

The determining system SYS can be, in particular, a computer, a microcontroller or an integrated circuit (IC). Alternatively, the determining system SYS can be a real or virtual computer network (a technical term for a real computer network is a "cluster" and a technical term for a virtual computer network is a "cloud"). The determining system SYS can be configured as a virtual system which is executed on a computer or a real computer network or a virtual computer network (a technical term for this is "virtualization").

The interface SYS.IF can be a hardware or software interface (for example, a PCI bus, a USB or a Firewire). The computing unit SYS.CU can comprise hardware and/or software constituents, for example, a microprocessor or a so-called field-programmable gate array (FPGA), which may be referred to as processing circuitry. The memory unit SYS.MU can be realized as a non-permanent working memory (Random Access Memory (RAM)) or as a permanent mass storage unit (hard disk, USB stick, SD card, solid state disk (SSD)).

The interface SYS.IF can, in particular, comprise a plurality of sub-interfaces which execute different method steps of the respective method according to one or more example embodiments of the present invention. In other words, the interface SYS.IF can be designed as a plurality of interfaces SYS.IF. The computing unit SYS.CU can comprise, in particular, a plurality of computing sub-units which execute different method steps of the respective method according to one or more example embodiments of the present invention. In other words, the computing unit SYS.CU can be configured as a plurality of computing units SYS.CU.

In some example embodiments, the term 'module', 'interface' or the term 'unit' may be replaced with the term 'circuit.' As an example, the computing unit SYS.CU may be part of, or include processor hardware (shared, dedicated, or group) that executes code and memory hardware (shared, dedicated, or group) that stores code executed by the processor hardware.

Where it has not yet explicitly been stated, although useful and in the spirit of one or more example embodiments of the present invention, individual exemplary embodiments, individual sub-aspects or features thereof can be combined and/or exchanged with one another without departing from the scope of the present invention. Advantages of the invention described in relation to an exemplary embodiment also apply, where transferrable, to other exemplary embodiments without this being explicitly stated.

FIG. 5 shows an example of a data stream on execution of a method for determining an optimal execution location for an application.

The execution locations a, b, c in this exemplary embodiment are a local computer, for example a local modality, an edge system and a cloud system. A load indicator IVa, IVb, IVc runs in each of these execution locations. In addition, each of the execution locations comprises an application manager client IIIa, IIIb, IIIc.

Data that is to be processed with the application Va and/or to which the application Va is to be applied is placed and/or stored in a data store VII. The data store VII can also be a data store distributed over the execution locations a, b, c. In particular, the data store VII can be arranged in one of the execution locations a, b, c.

In some embodiments of the invention, the application Va can also comprise a user interface Vb via which a user U can control the application Va, for example, initiate the execution of the application. Alternatively, the application can be executed independently and/or autonomously and/or automatically and/or without user interaction.

The user U, for example a medical practitioner, in particular a radiologist, can control the execution of the application via a local computer, for example, a modality VI. The modality VI can therein be configured, in particular, to capture the data. The local computer VI comprises an application manager II.

If the user U specifies on the local computer VI that the application Va is to be executed, in a first step S1, an execution demand is transmitted to a higher-order application manager I. The higher-order application manager I can run, for example, on a server. The higher-order application manager I can form, in particular, the determining system SYS described in relation to FIG. 4. With the execution demand, the at least one application parameter configured as in FIGS. 2 and/or 3 can be transmitted to and/or provided on the higher-order application manager I.

In a second step S2, the higher-order application manager I requests, via the respective application manager clients IIIa, IIIb, IIIc, the execution parameters, configured as described in relation to FIGS. 1 to 3, of the different execution locations a, b, c. The application manager clients IIIa, IIIb, IIIc determine in a first substep of a third step S3*a*, a network connection quality from the respective execution location a, b, c to the local computer VI of the user U. In a second substep of the third step S3*b*, the application manager clients IIIa, IIIb, IIIc determine a data connection for an access to the data in the data store VII. In a third substep of the third step S3*c*, the application manager clients IIIa, IIIb, IIIc determine a capacity utilization of the corresponding execution location a, b, c by way of a request to the respective load indicator IVa, IVb, IVc. Therein, the network connection quality, the data connection for the access to the data and the capacity utilization are each an execution parameter for each of the execution locations a, b, c. The execution parameters can be determined for a current time point. Alternatively, the execution parameters can be determined, as described in relation to FIG. 3, for a time point in the future at which the application Va is to be executed. The execution parameters are provided during the request in the second step S2 by way of the higher-order application manager I from each execution location a, b, c and/or from each application manager client IIIa, IIIb, IIIc of the execution locations a, b, c to the higher-order application manager I.

As described in relation to FIGS. 2 and/or 3, the higher-order application manager I determines the optimal execution location, dependent upon the at least one application parameter provided and the execution parameters provided. In a fourth step S4, the higher-order application manager I starts the application Va at the determined optimal execution location b. In particular, the higher-order application manager I can inform the application manager II of the local computer VI about the optimal execution location b.

In some embodiments of the invention, the application manager II of the local computer VI can then start the user interface Vb of the application. Via the user interface Vb, in a fifth step S5 the user U receives access to the application Va at the optimal execution location b. The user U can, for example, then start and/or initiate the execution of the application Va. In other words, the user U can utilize the application Va on the data at the optimal execution location b.

Alternatively, the application Va can be executed directly on starting of the application Va by way of the higher-order application manager I and/or applied to the data. In particular, in some embodiments of the invention, no user input is necessary.

As described above, the application Va can be executed in a container at the optimal execution location b.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein and mentioned above, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific structural and functional details disclosed herein are merely representative for purposes of describing example embodiments. The present invention may, however, be embodied in many alternate forms and should not be construed as limited to only the embodiments set forth herein.

The invention claimed is:

1. A computer-implemented method for determining an optimal execution location for an application, the method comprising:

providing a plurality of application parameters via the application, the plurality of application parameters identifying a condition for execution of the application, wherein a weighting factor is associated with each application parameter of the plurality of application parameters;

determining available execution locations, each of the available execution locations providing a plurality of corresponding execution parameters, each execution parameter of the plurality of execution parameters corresponding to an application parameter of the plurality of application parameters, the plurality of execution parameters quantifying a suitability of the corresponding available execution location, wherein the available execution locations include at least one network execution location and at least one local execution location;

determining an optimal execution parameter based on the condition for execution of the application;

determining the optimal execution location based on the provided execution parameters, the weighting factors of the application parameters, and the optimal execution parameter, the optimal execution location being a desired execution location for carrying out the application; and providing the optimal execution location.

2. The method of claim 1, further comprising:

executing the application at the optimal execution location.

3. The method of claim 2, wherein the executing executes the application in a container at the optimal execution location.

4. The method of claim 1, wherein the condition for execution of the application includes at least one of:

data access speed, network speed, storage location for data, data quantity, current resource availability, predicted resource availability, costs of the execution, costs of data storage, data security requirements, performance requirements, or latency.

5. The method of claim 1, wherein the application is configured for processing of data, and the weighting factors depend upon the data to be processed by the application.

6. The method of claim 1, wherein the application is configured for processing of data, and the plurality of application parameters depend upon the data to be processed by the application.

7. The method of claim 1, wherein the determining the available execution locations determines the available execution locations at a first time point and the method further comprises:

planning execution of the application at the optimal execution location at a second time point, the first time point being temporally before the second time point, and the determining the available execution locations includes, determining the plurality of execution parameters of the execution location for the second time point for each execution location.

8. The method of claim 7, wherein the determining the plurality of execution parameters includes applying a trained function to a plurality of prior execution parameters from the first time point corresponding to the plurality of execution parameters.

9. The method of claim 7, wherein the application is configured for processing of data, the data is captured at a third time point, the third time point being temporally before the second time point, the first time point being temporally before the third time point or the first time point is identical to the third time point, and the data is transmitted on capture directly to the optimal execution location.

10. The method of claim 1, wherein the application is a medical application.

11. The method as claimed in claim 1, wherein the available execution locations correspond to a location of at least one of a cloud system, an edge system, a local computer, a modality, a local computer center or a central computing center.

12. The method of claim 1, wherein, after the determining of the optimal execution location, a user receives access to the optimal execution location for execution of the application.

13. A determining system for determining an optimal execution location for an application comprising:

an interface; and a computing unit, at least one of the interface or the computing unit being configured to, provide a plurality of application parameters via the application, the plurality of application parameters identifying a condition for execution of the application, wherein a weighting factor is associated with each application parameter of the plurality of application parameters, determine available execution locations, and determine an optimal execution parameter based on the condition for execution of the application;

the interface being configured to receive a plurality of corresponding execution parameters from each of the available execution locations, each execution parameter of the plurality of execution parameters corresponding to an application parameter of the plurality of application parameters, the plurality of execution parameters quantifying a suitability of the corresponding available execution location, wherein the available execution locations include at least one network execution location and at least one local execution location, the computing unit configured to determine the optimal execution location for carrying out the application based on the plurality of execution parameters received, the weighting factors of the application parameters, and the optimal execution parameter, and the interface being further configured to provide the optimal execution location.

14. A non-transitory computer-readable storage medium having program portions that, when executed by a determining system, causes the determining system to perform the method of claim 1.

15. The method of claim 5, wherein the determining the available execution locations determines the available execution locations at a first time point and the method further comprises:

planning execution of the application at the optimal execution location at a second time point, the first time point being temporally before the second time point, and the determining the available execution locations includes, determining the plurality of execution parameters of the execution location for the second time point for each execution location.

16. The method of claim 15, wherein the determining the at least one execution parameter includes applying a trained function to a plurality of prior execution parameters from the first point in time corresponding to the plurality of execution parameters.

17. A computer-implemented method for determining an optimal execution location for an application configured for processing data, the method comprising:

planning execution of the application at an optimal execution location at a second time point, a first time point being temporally before the second time point;

determining available execution locations at the first time point, each of the available execution locations providing at least one execution parameter, the at least one execution parameter quantifying a suitability of a corresponding available execution location, wherein the available execution locations include at least one network execution location and at least one local execution location;

determining the at least one execution parameter of the execution location for the second time point for each execution location;

determining the optimal execution location for the second time point based on the provided execution parameters, the optimal execution location being a desired execution location for carrying out the application; and providing the optimal execution location, wherein the data for processing is captured at a third time point, the third time point being temporally before the second time point, the first time point being temporally before the third time point or identical to the third time point, and the data is transmitted directly on capture to the optimal execution location.

18. A non-transitory computer-readable storage medium having program portions that, when executed by a determining system, causes the determining system to perform the method of claim 17.

19. The method of claim 17, wherein the determining the at least one execution parameter includes applying a trained function to a plurality of prior execution parameters from the first time point corresponding to the plurality of execution parameters.

20. The method of claim 17, further comprising:

executing the application at the optimal execution location.

* * * * *